(12) United States Patent
Collino et al.

(10) Patent No.: US 11,548,222 B2
(45) Date of Patent: Jan. 10, 2023

(54) SYSTEM FOR THREE-DIMENSIONAL (3D) PRINTING WITH PIEZOELECTRIC DEVICE

(71) Applicant: The Regents of the University of California, Oakland, CA (US)

(72) Inventors: Rachel Collino, Goleta, CA (US); Tyler Ray, Goleta, CA (US); Matthew Begley, Goleta, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/853,518

(22) Filed: Apr. 20, 2020

(65) Prior Publication Data

US 2020/0316859 A1 Oct. 8, 2020

Related U.S. Application Data

(63) Continuation of application No. 15/554,079, filed as application No. PCT/US2016/025259 on Mar. 31, 2016, now abandoned.

(Continued)

(51) Int. Cl.
   *B29C 64/209* (2017.01)
   *B33Y 70/00* (2020.01)
   (Continued)

(52) U.S. Cl.
   CPC .......... *B29C 64/209* (2017.08); *B29C 64/112* (2017.08); *B33Y 10/00* (2014.12);
   (Continued)

(58) Field of Classification Search
   CPC ..... B29C 64/209; B29C 64/112; B33Y 10/00; B33Y 30/00; B33Y 40/00; B33Y 70/00; B29K 2063/00; B29K 2105/0061
   See application file for complete search history.

(56) References Cited

U.S. PATENT DOCUMENTS

| 4,208,277 A | 6/1980 | Bell et al. |
| 4,666,735 A | 5/1987 | Hoover et al. |

(Continued)

FOREIGN PATENT DOCUMENTS

| CN | 101614731 A | * | 12/2009 | ........... A01N 1/0284 |
| CN | 203525731 U | * | 4/2014 | ........ B01L 3/502761 |

(Continued)

OTHER PUBLICATIONS

Adams-Soh NPL (Appl. Phys. Lett. 97, 064103) (Year: 2010).*

(Continued)

*Primary Examiner* — Joseph S Del Sole
*Assistant Examiner* — Guy F Mongelli
(74) *Attorney, Agent, or Firm* — Billion & Armitage (57) ABSTRACT

A three-dimensional (3D) printer includes an acoustophoresis device having at least a first inlet, a first outlet, and a channel defined between the first inlet and the first outlet. A piezoelectric device is adhered to a surface of the acoustophoresis device to generate sound waves within the channel. A printhead is connected to the first outlet of the acoustophoresis device, wherein a solution comprising anisotropic particles is delivered to the at least first inlet and wherein the anisotropic particles are organized into one or more columns along an axis parallel to a direction of flow of the solution by standing acoustic waves generated by the piezoelectric device, wherein the at least one column of anisotropic particles is aligned with the first outlet, and wherein the first outlet is in fluid communication with the printhead to deliver one or more columns of ordered, anisotropic particles to the printhead.

8 Claims, 10 Drawing Sheets

Related U.S. Application Data (60) Provisional application No. 62/141,053, filed on Mar. 31, 2015.

(51) Int. Cl.
  B33Y 10/00    (2015.01)
  B33Y 30/00    (2015.01)
  B29C 64/112   (2017.01)
  B33Y 40/00    (2020.01)
  B29K 63/00    (2006.01)
  B29K 105/00   (2006.01)

(52) U.S. Cl.
  CPC .............. *B33Y 30/00* (2014.12); *B33Y 40/00* (2014.12); *B33Y 70/00* (2014.12); *B29K 2063/00* (2013.01); *B29K 2105/0061* (2013.01)

(56) References Cited

U.S. PATENT DOCUMENTS

| | | | |
|---|---|---|---|
| 5,003,516 | A | 3/1991 | Sato et al. |
| 5,211,993 | A | 5/1993 | Kolesinski |
| 6,200,643 | B1 | 3/2001 | Sugai et al. |
| 6,907,996 | B1 | 6/2005 | Fraas |
| 2002/0009015 | A1 | 1/2002 | Laugharn et al. |
| 2002/0037527 | A1 | 3/2002 | Ellson et al. |
| 2002/0043742 | A1* | 4/2002 | Kawamura .............. B41J 2/164 264/267 |
| 2003/0116747 | A1 | 6/2003 | Lem et al. |
| 2003/0138852 | A1 | 7/2003 | Ellson et al. |
| 2004/0072278 | A1* | 4/2004 | Chou ................. G01N 15/1456 436/63 |
| 2005/0194314 | A1 | 9/2005 | Lutz et al. |
| 2006/0114296 | A1 | 6/2006 | Gascoyne et al. |
| 2007/0296914 | A1 | 12/2007 | Hong et al. |
| 2008/0003142 | A1* | 1/2008 | Link ..................... C12Q 1/6869 422/82.08 |
| 2008/0029334 | A1 | 2/2008 | Roach et al. |
| 2008/0044685 | A1 | 2/2008 | Jin |
| 2009/0042310 | A1 | 2/2009 | Ward et al. |
| 2009/0287356 | A1* | 11/2009 | Dunne ............. G01N 35/00613 700/282 |
| 2010/0124142 | A1 | 5/2010 | Laugharn et al. |
| 2010/0317093 | A1* | 12/2010 | Turewicz ................ B01L 3/505 204/600 |
| 2011/0034586 | A1* | 2/2011 | Buskila .................. B29C 67/242 523/216 |
| 2011/0074231 | A1 | 3/2011 | Soderberg |
| 2011/0123392 | A1 | 5/2011 | Dionne et al. |
| 2011/0154890 | A1 | 6/2011 | Holm et al. |
| 2011/0250217 | A1 | 10/2011 | Kayed et al. |
| 2012/0129190 | A1 | 5/2012 | Chiu et al. |
| 2012/0177646 | A1 | 7/2012 | Belouski et al. |
| 2012/0304749 | A1 | 12/2012 | Kaduchak et al. |
| 2013/0014826 | A1 | 1/2013 | Kaduchak et al. |
| 2013/0192958 | A1 | 8/2013 | Ding et al. |
| 2013/0306566 | A1 | 11/2013 | Mao et al. |
| 2013/0328975 | A1 | 12/2013 | Redding et al. |
| 2014/0008307 | A1 | 1/2014 | Guldiken et al. |
| 2014/0033808 | A1* | 2/2014 | Ding ....................... C12M 47/04 73/61.75 |
| 2014/0035995 | A1 | 2/2014 | Chou et al. |
| 2014/0052285 | A1 | 2/2014 | Butcher et al. |
| 2014/0086862 | A1 | 3/2014 | Nakamura et al. |
| 2014/0147510 | A1 | 5/2014 | Lahann et al. |
| 2014/0193381 | A1 | 7/2014 | Warner et al. |
| 2014/0230912 | A1 | 8/2014 | Aider et al. |
| 2014/0306371 | A1 | 10/2014 | Guenther et al. |
| 2014/0336062 | A1 | 11/2014 | Graves et al. |
| 2015/0008367 | A1 | 1/2015 | Hartman et al. |
| 2015/0017444 | A1 | 1/2015 | Gang et al. |
| 2015/0066440 | A1 | 3/2015 | Chen et al. |
| 2016/0346997 | A1 | 12/2016 | Lewis et al. |
| 2016/0354896 | A1 | 12/2016 | Lewis et al. |

FOREIGN PATENT DOCUMENTS

| | | | | |
|---|---|---|---|---|
| CN | 104350374 | A * | 2/2015 | ........ B01L 3/502761 |
| EP | 2783837 | A1 * | 10/2014 | .......... B29C 64/112 |
| WO | WO-03085379 | A2 * | 10/2003 | ........ B01L 3/502738 |
| WO | WO-2004088283 | A2 * | 10/2004 | .......... A01N 1/0284 |

OTHER PUBLICATIONS

"Free FLow Acoustophoresis—FFA", Elektrisk Matteknik:, Dec. 3, 2015, 1-2.
Araz, et al., "Ultrasonic Separation in Microfluidic Capillaries", Araz et al., "Ultrasonic Separation in Microfluidic Capillaries", 2003 IEEE Untrasocis Symposium—1111, 2003, 4 pp.
Avetisyan, et al., Avetisyan et al., "On heavy particle behavior in viscous liquid in a standing ultrasonic wave field", Akusticheskii Z 31: 385-386 (1985) (Non-English—no translation available).
Barsanti, "Algae: Anatomy, Biochemistry, and Biotechnology", Barsanti et al., "Algae: Anatomy, Biochemistry, and Biotechnology", 2nd Edition, RCR Boca Raton, 2014.
Barthelat, et al., "On the mechanics of mother-of-pearl: A key feature in the material hierarchical structure", Barthelat et al., "On the mechanics of mother-of-pearl: A key feature in the material hierarchical structure", Journal of Mechanics and Physics of Solids 55 (2) (2007) 306-337.
Beech, et al., "Sorting cells by size, shape, and deformability", Beech et al., "Sorting cells by size, shape, and deformability", Lab Chip 12, 1048-1051 (2012).
Begley, et al., "Micromechanical models to guide the development of synthetic 'brick and mortar' composites", Begley et al., "Micromechanical models to guide the development of synthetic 'brick and mortar' composites", Journal of the Mechanics and Physics of Solids, 2012, 16 pp.
Bender, et al., "Microbial mats for multiple applications in aquaculture and bioremediation", Bender et al., "Microbial mats for multiple applications in aquaculture and bioremediation", Bioresource Technology 94, (2004), 229-238.
Born, et al., "Principles of Optics", M. Born et al., "Principles of OPtics", 6th Edition, Pergamon, New York, 1980, 858 pp.
Bosma, et al., "Ultrasound, a new separation technique to harvest microalgae", Bosma et al., "Ultrasound, a new separation technique to harvest microalgae", Journal of Applies Phycology 15, 143-153, 2003.
Bouville, et al., "Strong, tough, and Stiff bioinspired ceramics from brittle constituents", Bouville et al., "Strong, tough, and Stiff bioinspired ceramics from brittle constituents", Nat. Mater. 13, 508-514, 2014.
Brodeur, "Motion of fluid-suspended fibres in a standing wave field", P. Brodeur, "Motion of fluid-suspended fibres in a standing wave field", Ultrasonics, vol. 29, Jul. 1991, 6 pp.
Bruus, "Acoustofluidics 7: The acoustic radiation force on small particles", Henrik Bruus et al., "Acoustofluidics 7: The acoustic radiation force on small particles", Lab Chip 12, 1014-1021 (2012).
Carlsson, et al., "Mirco-And Macro-Algaue: Utility for Industrial Applications", Carlsson et al., "Mirco-And Macro-Algaue: Utility for Industrial Applications", CPL Press, UK, 2007, 86 pp.
Christi, "Biodiesel from microalgae", Yusuf Christi, "Biodiesel from microalgae", Biotechnology Advances 25 (2006), 13 pp.
Chung, et al., "Recent advances in miniaturized microfluidic flow cytometry", Chung et al., "Recent advances in miniaturized microfluidic flow cytometry", Electrophoresis, vol. 28, 2007, 10 pp.
Collino, et al., "Microfluidic masonry: tunable patterning and assembly of anisotropic particles via acoustophoresis", 1-23.
Collino, et al., "Supplementary Information re Microfluidic masonry: tunable patterning and assembly via acouostophoresis", Feb. 20, 2015, 1-3.
Compton, et al., "3D-Printing of Lightweight Cellular Composities", Compton et al., "3D-Printing of Lightweight Cellular Composities", Advanced Materials, vol. 26, Issue 34, Sep. 10, 2014, abstract, 1 pp.

(56) References Cited

OTHER PUBLICATIONS

Craggs, et al., "Phosphorous Removal From Wastewater Using an Algal Turf Scrubber", Water Sci Technology, vol. 33, No. 7, pp. 191-198, 1996.
Czyz, et al., "Forces due to Diffraction of Sound-Wave on Small-Diameter Cylindrical Particles", Czyz et al., "Forces due to Diffraction of Sound Wave on Small-Diameter Cylindrical Particles", J. Phys. IV 2, 741-744 (1992).
Doblhoff-Dier, et al., "A Novel Ultrasonic Resonance Field Device for the Retention of Animal Cells", Dobhoff-Dier et al., "A Novel Ultrasonic Resonance Field Device for the Retention of Animal Cells", Biotechnol. Prog., vol. 10, 1994, 5 pp.
Doinikov, "Acoustic Radiation Pressure on a Compressible Sphere in a Viscous Fluid", Doinikov et al., "Acoustic Radiation Pressure on a Compressible Sphere in a Viscous Fluid", Journal of Fluid Mechanics, May 1194, 22 pp.
Doinikov, "Acoustic radiation pressure on a rigid sphere in a viscous fluid", Doinikov, "Acoustic radiation pressure on a rigid sphere in a viscous fluid", The Royal Society, 1994, 20 pp.
Dubose, et al., "Microfluidic electrical sorting of particles based on shape in a spiral microchannel", DuBose et al., Microfluidic electrical sorting of particles based on shape in a spiral microchannel, Biomicrofluidics 8 (1). (2014) 9 pp.
Dukhin, et al., "Bulk viscosity and compressibility measurement using acoustic spectroscopy", Dukhin et al., "Bulk viscosity and compressibility measurement using acoustic spectroscopy", The Hournal of Chemical Physics 130, 124519 (2009), 14 pp.
Esposito, et al., "Fabrication of thin yttria-stabilized-zirconia dense electrolyte layers by inkjet printing for high performing solid oxide fuel cells", Esposito et al., "Fabrication of thin yttria-stabilized-zirconia dense electrolyte layers by inkjet printing for high performing solid oxide fuel cells", Journal of Power Sources, vol. 273, Jan. 1, 2015, abstract, 1 pp.
Fabritius, et al., "Influence of Structural Principles on the Mechanics of a Biological Fiber-Based Composite Material with Hierarchical Organization: The Exoskeleton of the Lobster *Homarus americanus*", Fabritius et al., "Influence of Structural Principles on the Mechanics of a Biological Fiber-Based Composite Material with Hierarchical Organization: The Exoskeleton of the Lobster *Homarus americanus*", Advancer Materials 21 (4) (2009), pp. 391-400.
Gherardini, et al., "A New Immobilisation Method to Arrange Particles in Gel Matrix by Ultrasound Standing Waves", Gherardini et al., "A New Immobilisation Method to Arrange Particles in Gel Matrix by Ultrasound Standing Waves" Ultrasound in Medicine & Biology, vol. 31, Issue 2, 2005, 12 pp.
Gillette, et al., "In situ collagen assembly for integrating microfabricated three-dimensional cell-seeded matrices", Gillette et al., "In situ collagen assembly for integrating microfabricated three-dimensional cell-seeded matrices", Nature Materials, vol. 7, Aug. 2008, 5 pp.
Gould, et al., "The effects of acoustic forces on small particles in suspension", Gould et al., "The effects of acoustic forces on small particles in suspension", UIn: Proc. 1973 Symposium, 1973, 6 pp.
Graves, et al., "Bulk Viscosity: Past to Present", Journal of Thermophysics and Heat Transfer, 1999, 337-341.
Greenhall, et al., "3D Printing Macroscale Engineered Materials Using Ultrasound Diected Self-Assembly and Stereolithography", Adv. Mater. Technol., 2017, 1-7.
Groschl, ""Ultrasonic Separation of Suspended Particles—PartI: Fundamentals"", Martin Groschl, "Ultrasonic Separation of Suspended Particles—PartI: Fundamentals", ACUSTICA, vol. 84, 1998, 16 pp.
Haar, et al., "Blood Cell Banding in Ultrasonic Standing Wave Fields: A Physical Analysis", Haar et al., "Blood Cell Banding in Ultrasonic Standing Wave Fields: A Physical Analysis", Ultrasound in Medicine & Biology, vol. 4, 1978, pp. 111-123.
Hasegawa, et al., "Acoustic-Radiation Force on a Solid Elastic Sphere", Hasegawa et al., "Acoustic-Radiation Force on a Solid Elastic Sphere", The Journal of the Acoustical Society of America, Vulme 46, Issue 1139, 1969, 6 pp.
Hasegawa, "Acoustic-Radiation Pressure on Spheres", Takahi Hasegawa, "Acoustic-Radiation Pressure on Spheres", Acoustical Society of Japan, 1970, 10 pp.
Hasegawa, "Comparison of two solutions for acoustic radiation pressure on a sphere", Hasegawa, "Comparison of two solutions for acoustic radiation pressure on a sphere", The Journal of the Acoustical Society of America, vol. 61, 1977, 5 pp.
Hawkes, et al., "A continuous flow ultrasonic cell-filtering method", Hawkes et al., "A continuous flow ultrasonic cell-filtering method", Enzymew and Microbial Technology, vol. 19, 1996, 6 pp.
Hur, et al., "Inertial focusing of non-spherical microparticles", Hur et al., "Inertial focusing of non-spherical microparticles", Appl. PHys. Lett. 99, 044101 (2011).
Johnson, et al., "Methodology for fractionating suspended particles using ultrasonic standing wave and divided flow fields", Johnson et al., "Methodology for fractionating suspended particles using ultrasonic standing wave and divided flow fields", Separations Technology, 5, 1995, 8 pp.
King, "On the Acoustic Radiation Pressure on Spheres", King et al., "On the Acoustic Radiation Pressure on Spheres", R. Roy. Soc. Lond. A Mat. 47, 212-240 (1934).
Klein, et al., "3D Printing of Transparent Glass", Susanne Klein et al., "3D Printing of Transparent Glass", HP Laboratories, Sep. 6, 2012, 4 pp.
Kozuka, et al., "Micromanipulation Using a Focuesed Ultrasonic Standing Wave Field", Kozuka et al., "Micromanipulation Using a Focuesed Ultrasonic Standing Wave Field", Electronics and Communications in Japan, Part 3, vol. 83, Isue 1, 2008, 8 pp.
Kuznetsova, et al., "Applications of Ultrasound Streaming and Radiation Force in Biosensors", Kuznetsova et al., "Applications of Ultrasound Streaming and Radiation Force in Biosensors", Biosensors and Bioelectroics, vol. 22, 2007, 11 pp.
LANL Communications Office, "Los Alamos Technology Strikes a Chord with Algal Biofuels", LANL Communications Office, "Los Alamos Technology Strikes a Chord with Algal Biofuels", Renewable Energy World, Sep. 11, 2009, 2 pp.
Laurell, et al., "Chip integrated strategies for acoustic separation and manipulation of cells and particles", Thomas Laurell et al., "Chip integrated strategies for acoustic separation and manipulation of cells and particles", Chem. Soc. Rev. 36, 492-506 (2007).
Leckey, et al., "Viscous effects in acoustic manipulation of algae for biofuel production", Leckey et al., "Viscous effects in acoustic manipulation of algae for biofuel production", Journal of Applied Phycology, vol. 24 No. 1, 2012, pp. 145-156.
Lim, et al., "Alignment of Carbon Nanotubes by Acoustic Manipulation in a Fluidic Medium", Lim et al., "Alignment of Carbon Nanotubes by Acoustic Manipulation in a Fluidic Medium", J. Phys. Chem C., vol. 11, 2007, 6 pp.
Lim, et al., "Rapid Magnetophoretic Separation of Microalgae", Lim et al., "Rapid Magnetophoretic Separation of Microalgae", Magnetic Separation, Small, Issue 8, No. 11, 2012, 10 pp.

\* cited by examiner

SYSTEM FOR THREE-DIMENSIONAL (3D) PRINTING WITH PIEZOELECTRIC DEVICE

CROSS-REFERENCE TO RELATED APPLICATIONS

This application is a continuation of U.S. patent application Ser. No. 15/554,079, filed on Aug. 28, 2017, which claims priority to PCT Application PCT/US2016/025258, filed on Mar. 31, 2016, which claims priority to U.S. Provisional Application No. 62/141,053, filed on Mar. 31, 2015, the disclosures of which are incorporated by reference in their entirety.

STATEMENT OF GOVERNMENT RIGHTS

This invention was made with Government support under Grant (or Contract) No. W911NF-09-D-0001, awarded by the Army Research Office. The Government has certain rights in this invention.

BACKGROUND

The manipulation of particles suspended in a solution is utilized in a number of applications, including filtration, biochemical diagnostics, and materials processing. Manipulation of these particles is typically accomplished via chemical, magnetic, electric, or rheological techniques that require either functionalized particles or a narrow range of particle/fluid properties.

It would be beneficial to develop a system and method of organizing and patterning particles suspended in a solution that allows particle orientation and patterning particles suspended in a solution that allows particle orientation and location to be controlled.

BRIEF SUMMARY OF THE INVENTION

An embodiment provides a method of ordering particles suspended in a solution in a channel, wherein the particles are unordered when entering the channel. The method further includes applying sound waves to the channel, wherein the frequency of the sound wave is tuned to create one or more columns of particles oriented in the same direction.

Another embodiment provides an apparatus for delivering ordered particles to a printhead of a three-dimensional printer. The apparatus includes an acoustophoresis device, a piezoelectric device, and a printhead. The acoustophoresis device includes at least a first inlet, at least a first outlet, and a channel defined between the first inlet and the first outlet. The piezoelectric device is adhered to a surface of the acoustophoresis device to generate sound waves within at least a portion of the channel. The solution provided to the first inlet of the acoustophoresis device includes particles, wherein the acoustic waves generated by the piezoelectric device organizes the particles into one or more columns along an axis parallel to a direction of flow of the solution. Then at least one column of particles is aligned with the first outlet, and wherein the first outlet delivers the one or more columns of particles to the printhead.

DETAILED DESCRIPTION

The present invention provides a system and method of organizing particles using acoustic waves. In particular, the acoustic waves provide a primary focusing force that drives particles to the pressure node of the standing wave, and secondary scattering forces that interact with the particles to align the particles end-to-end with one another within a given column, and to repel particles aligned with separate columns. The combination of these competing forces allows particles to be organized into a plurality of parallel columns By increasing the primary focusing force, the plurality of columns can be collapsed into a highly ordered column or array of particles. In this way, the present invention provides a system and method of selectively organizing particles in a way that is desirable for a particular application via selective modification/tuning of the acoustic waves applied. Benefits of utilizing acoustic waves to organize the orientation and location of particles include the ability to organize particles of various sizes and of different materials (i.e., material agnostic).

Figure 1:
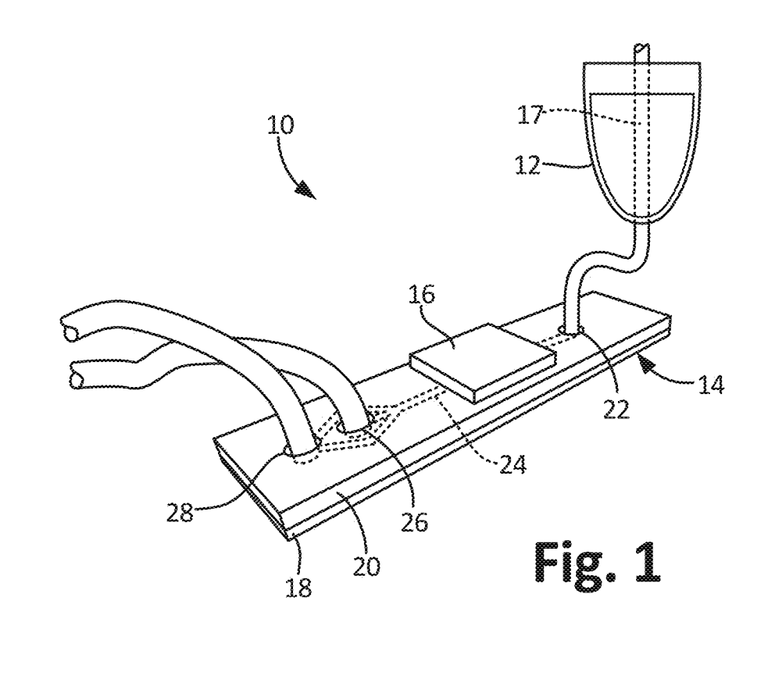
FIG. 1 is a perspective view of an acoustophoresis device that utilizes acoustic waves to organize particles suspended in a fluid into one or more columns according to an embodiment of the present invention.

FIG. 1 is a perspective view of acoustophoresis system 10 that utilizes acoustic waves to organize particles suspended in a fluid into one or more columns according to an embodiment of the present invention. System 10 includes reservoir 12, acoustophoresis device/chip 14, and piezoelectric device 16. Reservoir 12 holds a colloidal solution that includes microscopically dispersed insoluble particles. A variety of particle sizes may be utilized for particles with at least one dimension on the order of 100 nm or larger. Depending on the size, density, and/or buoyancy of the particles in the solution, sonicator 17 may be utilized to maintain a desired distribution of particles within the solution. For example, in one embodiment sonicator 17 is operated at a frequency of approximately 20 kHz to maintain the desired distribution of particles. In other embodiments, sonicator 17 may not be required to maintain the desired distribution of particles within the colloidal solution, and a passive reservoir may be utilized in isolation.

In the embodiment shown in FIG. 1, acoustophoresis device 14 is manufactured as a semiconductor device that includes glass layer 18 and semiconductor substrate 20. Acoustophoresis device 14 includes inlet 22, channel 24, and outlets 26 and 28. A variety of fabrication techniques may be utilized to fabricate acoustophoresis device 14, although in other embodiments the device may be fabricated using traditional, rather than semiconductor fabrication techniques. In the embodiment shown in FIG. 1, semiconductor substrate 20 is a silicon substrate having a thickness of approximately 525 µm. The silicon substrate is coated with an aluminum oxide film via an atomic layer deposition process to serve as a hard etch mask, which is patterned using photolithographic techniques and etched using a buffered oxide etch. Channel 24 is etched into semiconductor substrate 20 using a deep-reactive ion etching technique to provide a channel depth of approximately 150 µm. The aluminum oxide film (e.g., hard etch mask) is subsequently removed via a buffered oxide etch (e.g., buffered HF or BOE process) and the processed substrate is anodically bonded to glass layer 18 having pre-drilled fluidic vias to serve as inlet 22 and outlets 26 and 28.

Piezoelectric device 16 is bonded to the surface of acoustophoresis device 14 in the vicinity of channel 24. An excitation signal provided to piezoelectric device 16 generates acoustic waves directed toward channel 24. The magnitude and frequency of the acoustic waves are related to the magnitude and frequency of the excitation signal provided to piezoelectric device 16, which may be selectively modified to achieve the desired result. As described in more detail below, modifying the amplitude and frequency of the acoustic waves allows the particles to be organized in a controlled and/or tunable manner.

In the embodiment shown in FIG. 1, the solution retained within reservoir 12 is sup plied to acoustophoresis device 14 via inlet 22. As described in more detail below, the rate at which solution is provided to inlet 22 determines the flow rate through acoustophoresis device 14. Typically, organizing particles via traditional methods requires relatively low flow rates. A benefit of the present invention, as described below, is the ability to organize particles in the presence of flow. Upon entering channel 24 from inlet 22, particles are evenly suspended and randomly organized within the solution. Application of acoustic waves from piezoelectric device 16 causes the particles to organize within channel 24. In the embodiment shown in FIG. 1, the portion of channel 24 extending on the outlet side of piezoelectric device 16 is bifurcated such that particles located in the center of channel 24 are directed to outlet 26 and particles located on the edges of channel 24 are directed to second or waste outlet 28. In other embodiments, channel 24 may be designed with a different number of outlets and/or geometries based on the particulars of the application.

Figure 2:
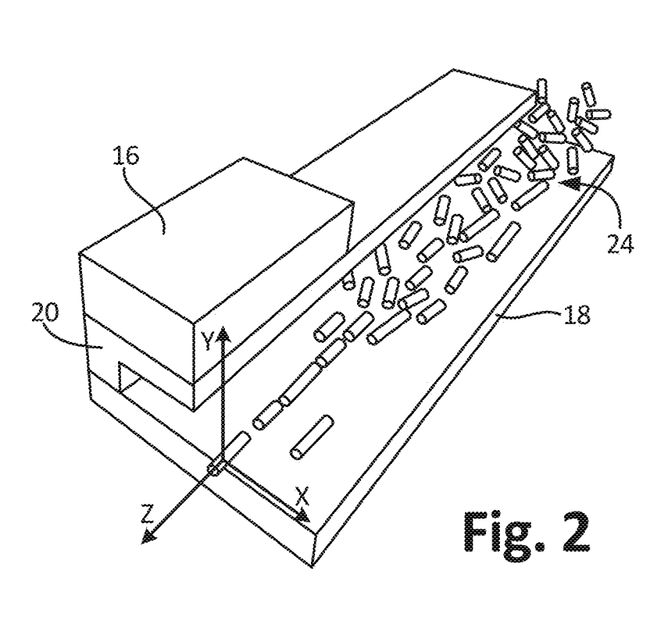
FIG. 2 is a magnified view that illustrates the organization of anisotropic particles within a channel of the acoustophoresis device according to an embodiment of the present invention.

FIG. 2 is a magnified view that illustrates the organization of anisotropic particles within channel 24 of the acoustophoresis device 14 according to an embodiment of the present invention. In the embodiment shown in FIG. 2, the particles are rod-like in shape, and are therefore anisotropic particles that exhibit attributes based on the orientation of the particles (e.g., greater strength in one direction than another). Upon entering channel 24, the anisotropic particles are distributed randomly throughout the channel and are oriented in random directions. The anisotropic particles flow in the z direction toward outlets 26 and 28. As the particles move past piezoelectric device 16, the acoustic waves generated by piezoelectric device 16 cause the particles to organize. As discussed in more detail below, two competing forces act on the particles to organize and pattern the particles. The first is a primary focusing force that drives particles that are denser (e.g., anisotropic particles in this example) to the pressure node of the standing acoustic wave. The second is a scattering force, which is attractive when the interacting particles are aligned parallel to the acoustic wave and repulsive when the particles are aligned perpendicular to the acoustic wave. As a result of the attractive scattering forces, anisotropic particles are snapped end-to-end in a given column (i.e., along the z axis). In addition, as illustrated in other embodiments, repulsive forces act to keep multiple assembled columns from collapsing into a single column.

In the embodiment shown in FIG. 2, however, anisotropic particles are aligned end-to-end in a single column near the middle of channel 24 (i.e., along the x axis). That is, the acoustic standing wave generated by piezoelectric device 16 has a wavelength approximately twice that of the channel width, and therefore has a pressure node near the center of channel 24. Once organized, the particles tend to retain this organization even after leaving the region of the channel located under piezoelectric device 16. As a result, particles organized into a column as shown in FIG. 2 would be provided to outlet 26 (shown in FIG. 1). A benefit of this arrangement is that outlet 26 is provided with a much higher volume fraction of particles than that provided at inlet 22. In addition, the anisotropic particles shown in FIG. 2 are oriented such that anisotropic attributes of the particles can be utilized. This is an important consideration in fields such as 3D printing, in which the strength of the printed device (i.e., the finished product) depends in part on the orientation of the particles deposited. One of the benefits of the embodiment illustrated in FIGS. 1 and 2 is the ability to order the particles in the presence of flow (i.e., while the particles are flowing through the channel from inlet to outlet). As described in more detail below, the dimensions of channels 24 may also be modified to accommodate different applications. In some embodiments, the height (i.e., y-axis) may be increased to allow for the stacking of columns in the y direction. In other embodiments, the width (i.e. x-axis) of channel 24 may be modified to accommodate more or fewer columns stacked adjacent to one another.

Figure 3A:
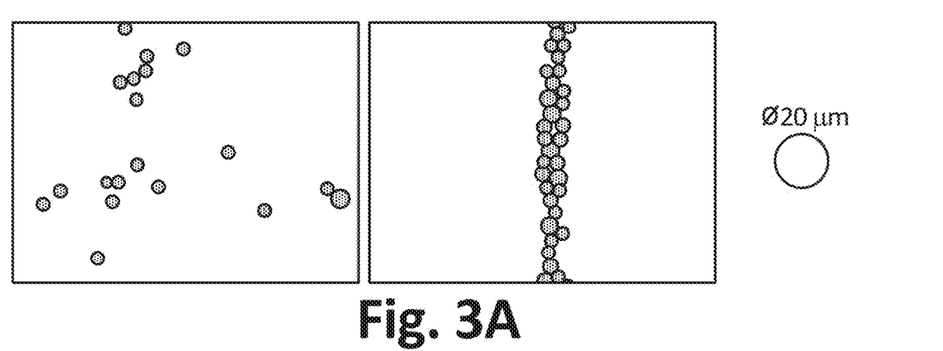
FIGS. 3a-3d are microscopic views of various shaped particles both in the absence of and presence of acoustic waves according to an embodiment of the present invention.
Figure 3B:
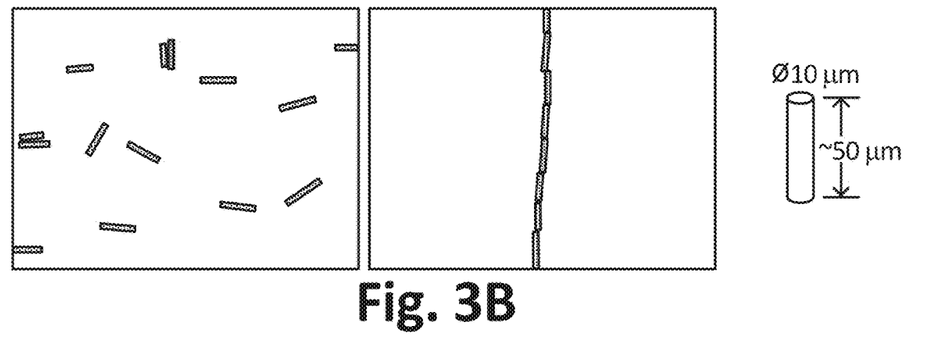
Figure 3C:
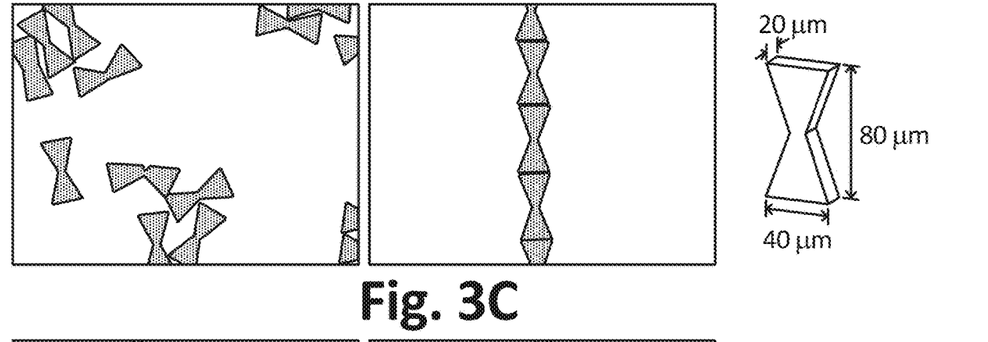
Figure 3D:
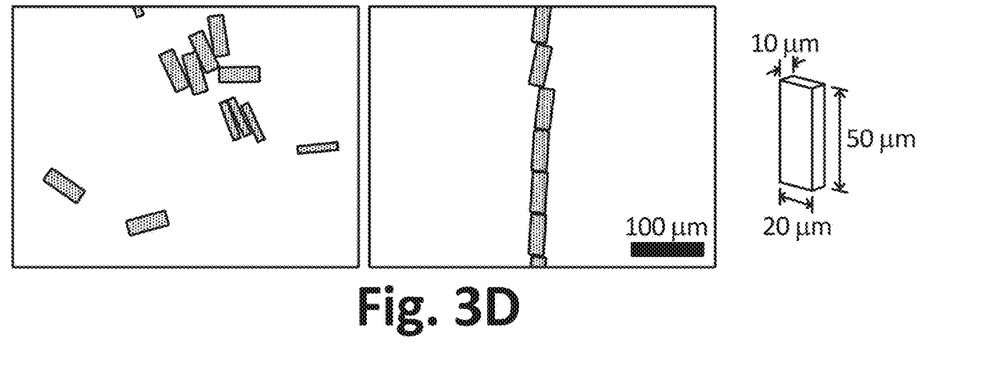

FIGS. 3a-3d are microscopic views of various shaped particles both in the absence of and presence of acoustic waves according to an embodiment of the present invention. In each figure, the left-hand side illustrates the particles in the absence of acoustic waves, while the right-side illustrates the particles in the presence of acoustic waves. FIG. 3a illustrates spherical particles (i.e., non-anisotropic) having a diameter of approximately 20 µm; FIG. 3b illustrates rod-like particles (i.e., anisotropic) having a length of approximately 50 µm and a diameter of approximately 10 µm; FIG. 3c illustrates how-tie shaped particles (i.e., anisotropic) having a height of approximately 80 µm, a width of approximately 20 µm, and a length of approximately 40 µm; and FIG. 3d illustrates brick shaped particles (also anisotropic) having a height of approximately 50 µm, a length of approximately 20 µm, and a width of approximately 10 µm.

The embodiment shown in FIG. 3a illustrates how application of acoustic waves cases the spherical particles to group together within the approximate center of the channel at the pressure node of the standing acoustic wave. Similarly, in the embodiment shown in FIG. 3b, application of acoustic waves causes the cylindrical particles to align within the approximate center of the channel. However, because the cylindrical shaped particles are anisotropic, scattering forces cause the particles to snap end-to-end, so that they are aligned along the long axis of each cylindrical particle. Similarly, the bow-tie shaped particles illustrated in FIG. 3c and the brick-shaped particles shown in FIG. 3d due to anisotropic attributes—are snapped end-to-end. The embodiments shown in FIGS. 3b-3d therefore illustrate the ability not only to control the location of the particles within the channel, but also to control the orientation of those particles. This is particularly beneficial in applications in which directional attributes of the particles provide advantageous benefits, such as in 3D printing applications, discussed below. It should be understood that the dimensions described with respect to FIGS. 3a-3d are exemplary, and other embodiments may utilize particles of different sizes and/or geometries.

Figure 4A:
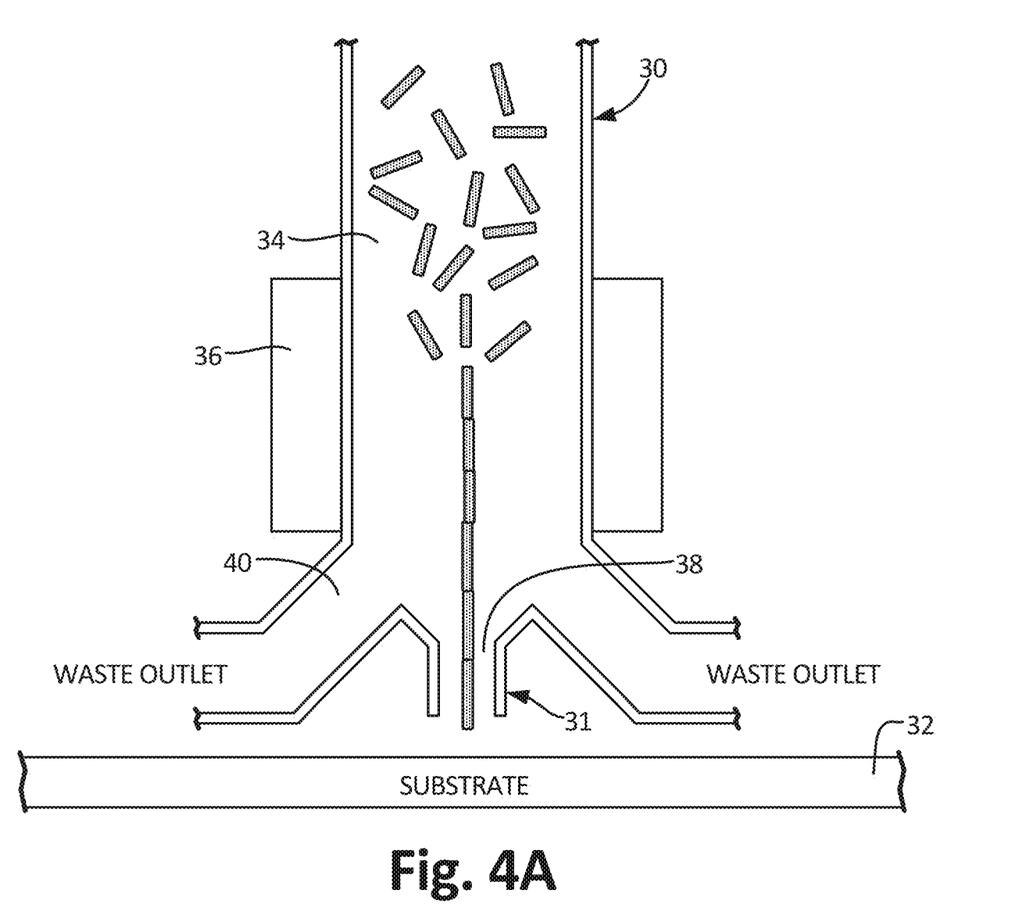
FIGS. 4a-4c are cross-sectional views of acoustophoresis devices utilized to deliver anisotropic particles organized into a column according to an exemplary application of the present invention.
Figure 4B:
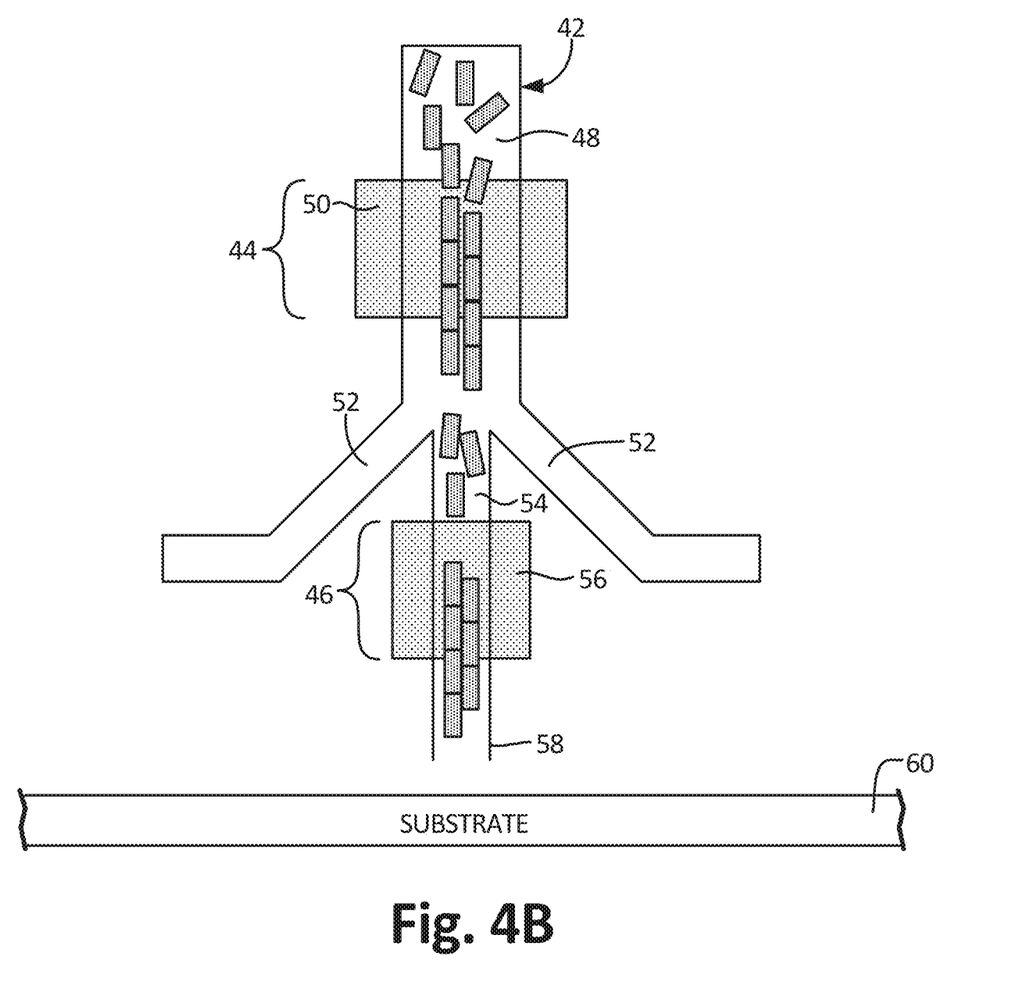
Figure 4C:
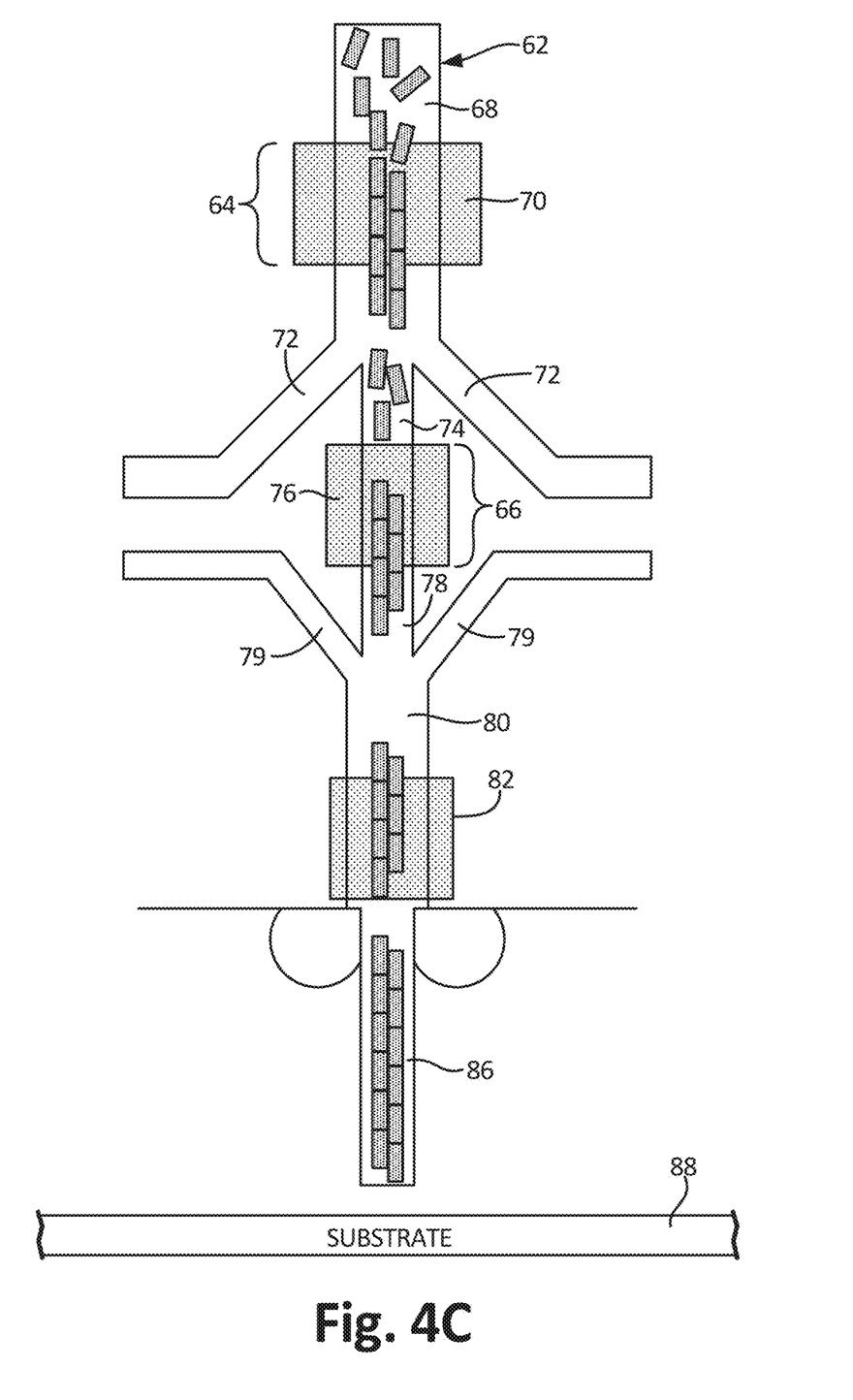

FIGS. 4a-4c are cross-sectional views of acoustophoresis devices utilized to deliver anisotropic particles organized into a column according to exemplary embodiments of the present invention. Each of the embodiments shown in FIGS. 4a-4c illustrate use of acoustophoresis devices to deliver anisotropic particles to a 3D printhead, although it will be recognized that in other embodiments the acoustophoresis devices shown in FIGS. 4a-4c may be utilized in other applications.

FIG. 4a illustrates a single-stage acoustophoresis device, FIG. 4b illustrates a two-stage acoustophoresis device, and FIG. 4c illustrates a two-stage acoustophoresis device that further includes a UV curing window In the embodiment shown in FIG. 4a, single stage acoustophoresis device 30 includes three-dimensional printhead 31, which is used to deposit material onto substrate 32 layer by layer, allowing a three-dimensional object to be constructed. An important attribute to 3D printing is the volume fraction of particles (i.e., concentration) that is delivered to the printhead. A common problem with particle delivery to printhead 31 is clogging of the printhead. As described below, the ability to locate particles within the center of the channel and orient the particles along their long axis allows a high volume fraction of particles to be delivered to the printhead. A benefit of focusing particles in an ordered manner is that it allows for particle concentrations that otherwise would result in clogging of the printhead.

In the embodiment shown in FIG. 4a, acoustophoresis device 30 includes channel 34, piezoelectric device 36, outlet 38, and waste outlet 40. A colloidal solution that includes suspended, anisotropic particles is flowed into channel 34. Acoustic waves generated by piezoelectric device 36 force the denser particles to the center of channel 34, to the pressure node of the standing acoustic wave. Scattering forces act on the anisotropic particles to snap them end-to-end, resulting in the cylinder shaped particles aligning into a single column in the middle of channel 34. As a result, anisotropic particles forced to the center of channel 34 are flowed into outlet 38, which provides the aligned particles to printhead 31. The received particles are deposited by printhead 31 onto substrate 32.

The embodiment shown in FIG. 4a takes advantage of the ability to control the location and orientation of the particles for purpose of increasing the density of particles directed to printhead 31. As a result, rather than providing randomly distributed and oriented particles to printhead 31, a single column of particles—each snapped end-to-end—is presented to printhead 31 via outlet 38. When the orientation of the particles is not controlled, the randomly oriented particles have the effect of clogging printhead 31. Controlling the orientation of the particles allows a higher concentration of particles to be provided to printhead 31, while preventing clogging of the printhead. Excess solution is routed via waste outlets 40 to a waste collection/recycling system.

Although not shown in FIG. 4a, in some embodiments additional steps are taken to ensure the particles—once ordered—remain that way when provided to printhead 31. This may be particularly important if the distance between piezoelectric device 36 and printhead 31 is substantial. This may include photopolymerization or thermal curing of the solution/particles upon exiting the portion of the channel in which the acoustic waves are generated. Photopolymerization utilizes light (e.g., ultra-violet (UV) light) to cure the colloidal solution (e.g., hydrogel or photocurable epoxy type solution) in which the particles are suspended, thereby preserving the ordering of the particles. In one embodiment, a light guide coupled to a LED is utilized to illuminate the colloidal solution for a time period sufficient to provide the desired photocuring. In other embodiments, particle ordering may be promoted by adding macromolecules that promote particle cohesion. For example, in one embodiment described in more detail with respect to FIG. 6d utilizes non-specific binding with DNA. This provides the desired cohesion, but still provides sufficient flexibility to allow subsequent manipulation of the particle pattern in the solution. In still other embodiments, ordering is preserved by utilizing a fluid with sufficient viscosity and elasticity to retain the shape of the solution during deposition. For example, in one embodiment, an epoxy-type fluid may be utilized that includes fillers to obtain the desired viscosity and elasticity during the deposition process. In addition, embodiments utilizes an epoxy-type fluid may benefit from thermal curing, wherein the ordered anisotropic particles suspended in the epoxy-type fluid are thermally cured prior to deposition to help maintain the ordering of the particles.

As described above, a benefit of providing ordered particles to printhead 31 is that it provides a greater concentration of particles to the printhead without causing clogging of the printhead. In addition, the ability to orient anisotropic particles being deposited on substrate 32 allows the product being built to take advantage of the anisotropic benefits of the particles. For example, the cylinder shaped particles shown in FIG. 4 may exhibit greater strength in one direction than another, and by depositing them in a desired orientation the product being constructed may take advantage of the directional attributes of the particles. An object constructed with all particles oriented in a particular direction may therefore exhibit additional strength over that provided by the same particles randomly oriented.

In the embodiment shown in FIG. 4b, acoustophoresis device 42 is a two-stage device—including first stage 44 and second stage 46. In the embodiment shown in acoustophoresis device 42 includes channel 48, first piezoelectric device 50, waste outlets 52, first outlet 54, second piezoelectric device 56, and second outlet 58. As described with respect to FIG. 4a, a colloidal solution that includes suspended, anisotropic particles is flowed into channel 48. In first stage 44, acoustic waves generated by piezoelectric device 50 force the denser particles to the center of channel 48, to the pressure node of the standing acoustic wave. Scattering forces act on the anisotropic particles to snap them end-to-end, resulting in the cylinder shaped particles aligning into one or more columns (e.g., two columns in the example illustrated in FIG. 4B). As a result, anisotropic particles forced to the center of channel 48 are flowed into first outlet 54. Rather than be provided directly to a printhead, particles flowed to first outlet 54 are provided to second stage 46 for additional organizing, as discussed below. Excess solution is routed via waste outlets 52 to a waste collection/recycling system (not shown).

In addition, the embodiment shown in FIG. 4b includes a second stage 46, which includes second piezoelectric device 56, Anisotropic particles provided by first outlet 54 are further organized by second piezoelectric device 56. In one embodiment the organization of particles provided by first and second stages 44 and 46, respectively, may be fine-tuned for different purposes. For example, in one embodiment first stage 44 is configured to provide filtering of particles for provision to first outlet 54 (i.e., to provide a high concentration of particles), while second stage 46 is configured to provide organization into a desired column formation (e.g., one-column, two columns, etc.) for provision to printhead 58. As shown in FIG. 4b, anisotropic particles organized in second stage 46 are provided to printhead 58 for deposition onto substrate 60.

In the embodiment shown in FIG. 4c, acoustophoresis device 62 may be described again as a two-stage device— including first stage 64 and second stage 66. However, the embodiment shown in FIG. 4c further includes a UV curing of the particles prior to deposition.

In the embodiment shown in FIG. 4c, acoustophoresis device 62 includes channel 68, first piezoelectric device 70, waste outlets 72, first outlet 74, second piezoelectric device 76, and second outlet 78. As described with respect to FIG. 4a, a colloidal solution that includes suspended, anisotropic particles is flowed into channel 68. In first stage 64, acoustic waves generated by piezoelectric device 70 force the denser particles to the center of channel 68, to the pressure node of the standing acoustic wave. Scattering forces act on the anisotropic particles to snap them end-to-end, resulting in the cylinder shaped particles aligning into one or more columns (e.g., two columns in the example illustrated in FIG. 4c). As a result, anisotropic particles forced to the center of channel 68 are flowed into first outlet 74. Rather than be provided directly to a printhead, particles flowed to first outlet 74 are provided to second stage 66 for additional organizing, as discussed below. Excess solution is routed via waste outlets 72 to a waste collection/recycling system (not shown).

Anisotropic particles provided by first outlet 74 are further organized by second piezoelectric device 76. Once again, the organization of particles provided by first and second stages 64 and 66, respectively, may be fine-tuned for different purposes. Anisotropic particles organized by second piezoelectric device 76 are provided to second outlet 78, In the embodiment shown in FIG. 4c, anisotropic particles provided to outlet 78 are combined with lubricating fluid provided by input channels 79. The combination of anisotropic particles and lubricating fluid are provided to ultraviolet (UV) curing window 8:2, wherein UV light is provided to cure the anisotropic particles in their patterned or organized state. Once cured, the anisotropic particles remain aligned within the patterned configuration, and can be provided to printed head 86 for deposition onto substrate 88. In other embodiments, rather than photocuring via curing window 82, the ordered anisotropic particles may be thermally cured after being deposited onto substrate 88. As discussed above, epoxy-type fluids may be utilized which can be thermally cured to retain the shape/ordering of the anisotropic particles.

Figure 5A:
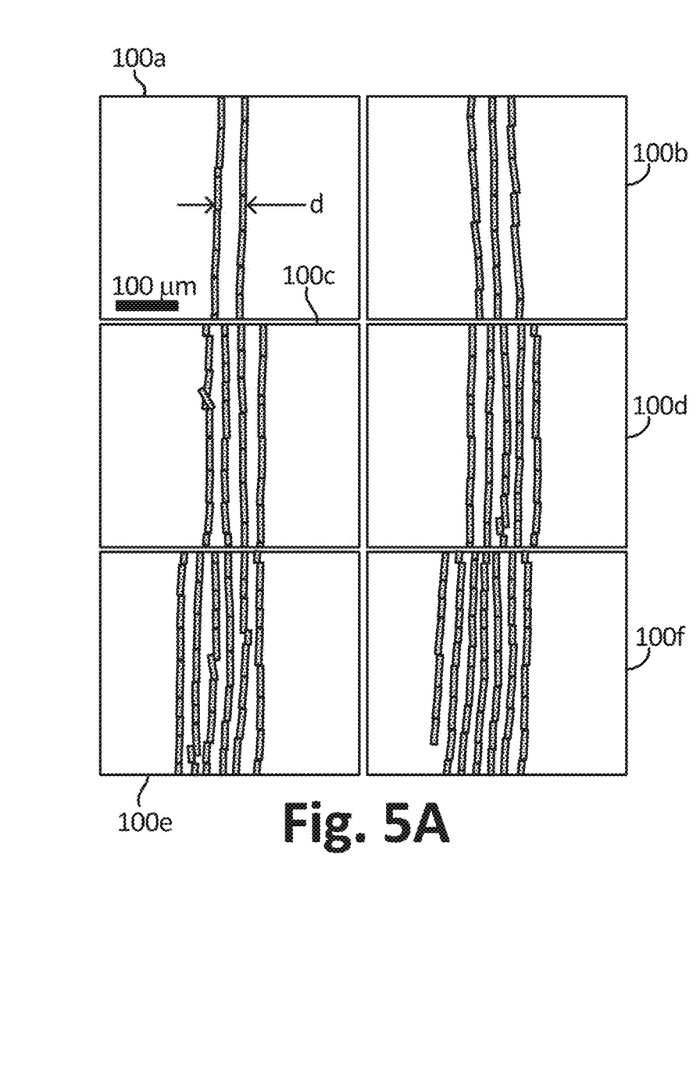
FIGS. 5a-5c are microscopic views and graphs illustrating the relationship between columnar spacing and number of columns according to embodiments of the present invention.

A benefit of the 3D or additive techniques described with respect to FIGS. 4a-4c is the ability to implement net-shape manufacturing techniques in which the shape of the printed product is very close to the final shape of the product. That is, the embodiments shown in FIGS. 4a-4c does not require subsequent cutting or molding of the ordered particles. In addition, ordering of the particles allows the particles to be deposited with a desired orientation to provide additional strength/resiliency attributes to the finished product. FIG. 5a is a microscopic view of anistropic particles organized into two or more columns according to exemplary embodiments of the present invention. Microscopic view 100a illustrates organization of the particles into two columns; microscopic view 100b illustrates organization of the particles into three columns, microscopic view 100c illustrates organization of the particles into four columns, microscopic view 100d illustrates organization of the particles into five columns, microscopic view 100e illustrates organization of the particles into six columns, and microscopic view 100f illustrates organization of the particles into seven columns.

The embodiments shown in FIG. 5a illustrate the ability to effectively tune the organization of particles into multiple columns. The organization of particles in this manner is a result of competition between the primary focusing force and the secondary scattering forces. Scattering forces are attractive when the interacting particles are aligned parallel to the acoustic wave and repulsive when the particles are aligned perpendicular to the acoustic wave. As a result of the attractive scattering forces, anisotropic particles are snapped end-to-end in a given column (i.e., along the z axis). In contrast, the repulsive forces act to keep multiple assembled columns from collapsing into a single column. For example, microscopic view 100a illustrates two columns of aligned anisotropic particles. Primary forces act on the particles to push them toward the pressure node of the standing acoustic wave (in this embodiment, to a point located between the two columns). However, repulsive scattering forces, balancing the primary force, act to maintain the columns a distance d from one another. As discussed in more detail below, increasing the magnitude (i.e., power) of the acoustic wave increases the magnitude of the primary force, which at some point overcomes the magnitude of the secondary scattering force and causes the two columns to collapse into a single column.

Figure 5B:
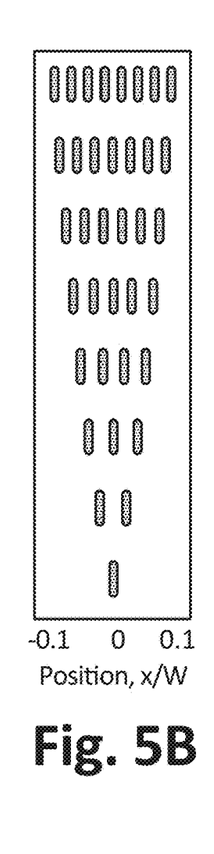
Figure 5C:
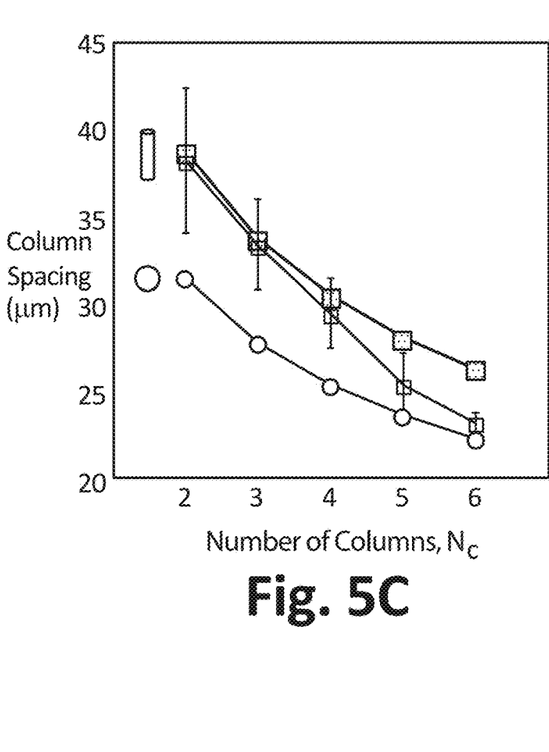

The ability to tune the organization of particles into two or more columns is illustrated in microscopic views 100a-100f. Through controlling the particle concentration, the anisotropic particles can be selectively ordered into a plurality of columns (seven in the embodiment shown in microscopic view 100f). Increasing the magnitude of the acoustic wave has the effect of collapsing the columns into adjacent columns. In addition, as illustrated in FIGS. 5a-5c, the distance between adjacent columns is related to the total number of columns. As the number of columns increases, the distance between each of the columns decreases.

This concept is illustrated in schematic fashion by FIG. 5b, which illustrates how the changing distance between columns is a function of number of columns according to an embodiment of the present invention. The bottom axis of the graph shown in FIG. 5b is defined as the position along the channel divided by the width of the channel. Although this axis would extend from −1 to 1, only −0.1 to 0.1 is shown, as columns are created within this region. As discussed above with respect to FIG. 5a, as the number of columns increases (toward the top of the graph), the distance between the columns decreases. FIG. 5b also illustrates how the columns are centered around the center of the channel, presumably the location of the pressure node of the standing wave.

FIG. 5c is a chart that illustrates spacing between columns as a function of both particle type and number of columns.

The y-axis describes the distance d between columns, while the x-axis describes the total number of columns $N_c$. The chart in Figure 5c illustrates the difference in spacing between anisotropic particles (cylindrical shaped) and non-anisotropic particles (spherical). In this case, particles were chosen with similar particle volumes so that the magnitude of the primary acoustic radiation force is similar between different particle shapes. FIG. 5c once again illustrates that as the number of columns increases, the spacing between each of the columns decreases. In addition, the example shown in FIG. 5c illustrates that the spacing between columns of anisotropic particles are greater than the spacing between columns of non-anisotropic particles. For example, when anisotropic particles are divided into two columns, the distance between the columns is approximately 38 μm. When the non-anisotropic particles are divided into two columns, the distance between the columns is approximately 32 μm. As the number of columns increases, the distance between the columns decreases, but the spacing between anisotropic particles remains greater than the spacing between non-anisotropic particles. Thus, the embodiment shown in FIG. 5c illustrates the effect particle size and shape has on spacing between columns.

FIGS. 6a-6e illustrate an additional aspect of organizing particles, in which rather than particles being configured in a single column, the columns are essentially stacked on top of one another in the y-direction (as shown in FIG. 2). In addition, FIGS. 6a-6e illustrate various methods of maintaining this stacked array configuration of particles via microscopic masonry according to various embodiments of the present invention.

Figure 6A:
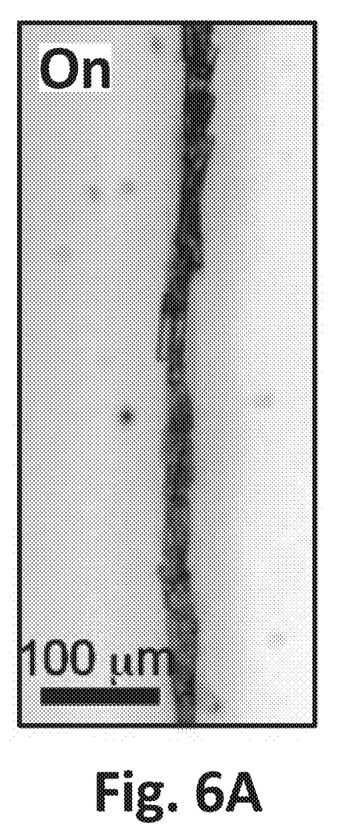
FIGS. 6a-6e illustrates stacking of anisotropic particles in the x-z plane in the presence of acoustic waves and maintenance of anisotropic particle organization following removal of the acoustic waves according to an embodiment of the present invention.
Figure 6B:
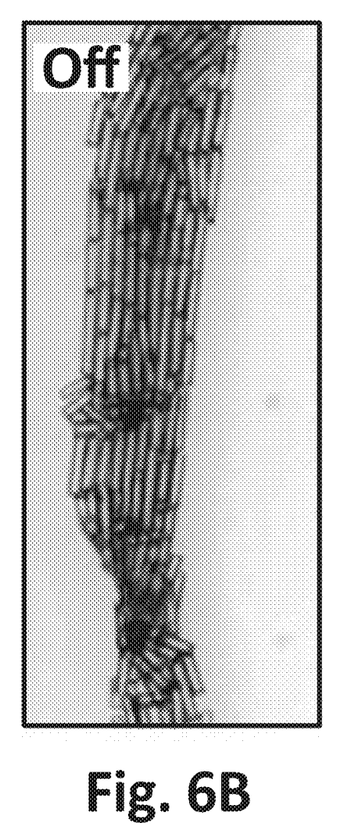
Figure 6C:
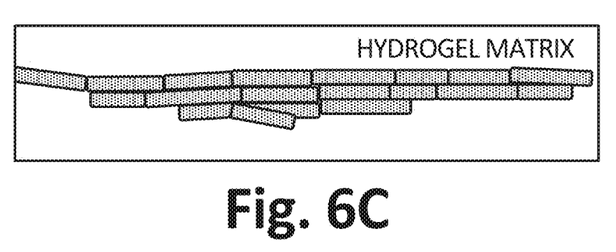

The view shown in FIGS. 6a and 6b represents a top view of the channel taken in the x-z plane (i.e., looking down into the channel). In particular, this embodiment shows that in the presence of acoustic waves, assuming a channel with sufficient height, a stacked array of particles can be formed with the stack extending out of the page in the y direction. In the embodiment shown in FIG. 6a, a voltage of approximately 40 $V_{pp}$ is applied to piezoelectric device, although in other embodiments the voltage may be increased/decreased as appropriate based on the pattern desired and the particles being manipulated. When the piezoelectric device is turned On, the particles are stacked into an array near the center of the channel. When the piezoelectric device is turned Off, gravity begins to pull on the stacked array of particles as shown in FIG. 6b, as the stacked array turns sideways to expose how the particles are stacked on top of one another in an array format. The stacked array may also be described as a ribbon-like structure. Benefits of the configuration of particles shown in FIG. 6b is the shared orientation of the particles as well as the close-packing of the particles in a micro-masonry configuration. Benefits of this configuration include added strength associated with the shared orientation and dense packing of the particles. In the embodiment shown in FIGS. 6a-6e, the particles are anisotropic particles that are well-suited for micro-masonry configurations.

In this way, FIGS. 6a and 6b illustrate another way in which anisotropic particles may be organized Rather than being organized into one or more plurality of columns, the particles are organized into a stacked array of particles, forming a ribbon-like structure. Although the particles— once patterned—tend to retain their shape for at least a nominal amount of time, in some embodiments it may be required or beneficial to retain the desired pattern. In the embodiment shown in FIG. 6c, a photopolymerization of the hydrogel solution in which the particles are suspended is utilized to preserve the desired pattern. As discussed previously, photopolymerization utilizes a hydrogel solution that can be photocured using application of light to the solution surrounding the ordered particles. In 3D printing applications, the rates of polymerization must be balanced with the desired transport properties of the suspension being provided to the print head. In other embodiments, rather than photopolymerization, ordering is preserved by utilizing a fluid with sufficient viscosity and elasticity to retain the shape of the solution during deposition. For example, in one embodiment, an epoxy-type fluid (rather than a hydrogel) may be utilized that includes fillers to obtain the desired viscosity and elasticity during the deposition process. In addition, the epoxy-type fluid may be thermally cured in order to further retain the ordering of anisotropic particles.

Figure 6D:
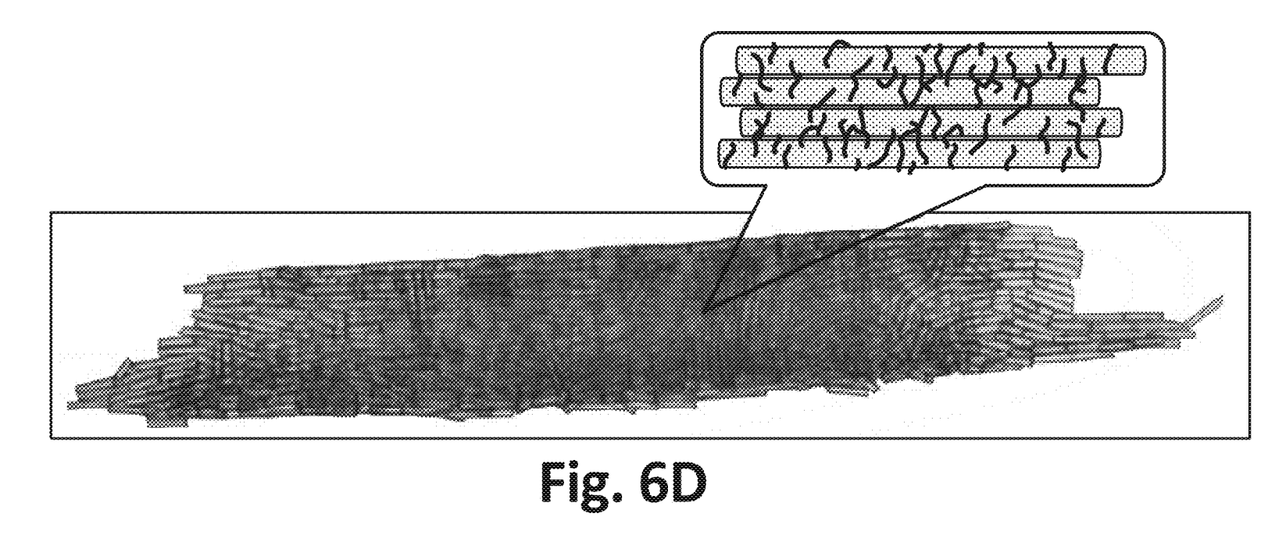

In the embodiment shown in FIG. 6d, pattern stability is promoted by adding macromolecules that promote particle cohesion according to another embodiment of the present invention. In one embodiment, the array or pattern of particles is held together via non-specific binding with DNA. For example, in the embodiment shown in FIG. 6d (including the magnified portion), the stacked array of rod-shaped particles (in this case, glass rods) are focused in a chaotropic solution with dispersed DNA. The chaotrope drives DNA onto the surfaces of the rod-shaped particles, creating cohesive interactions between a single DNA strand and adjacent rods in packed arrays. In one embodiment the DNA concentration utilized is sufficient to coat the surfaces of the particles as well as the surface of the channel walls.

Figure 6E:
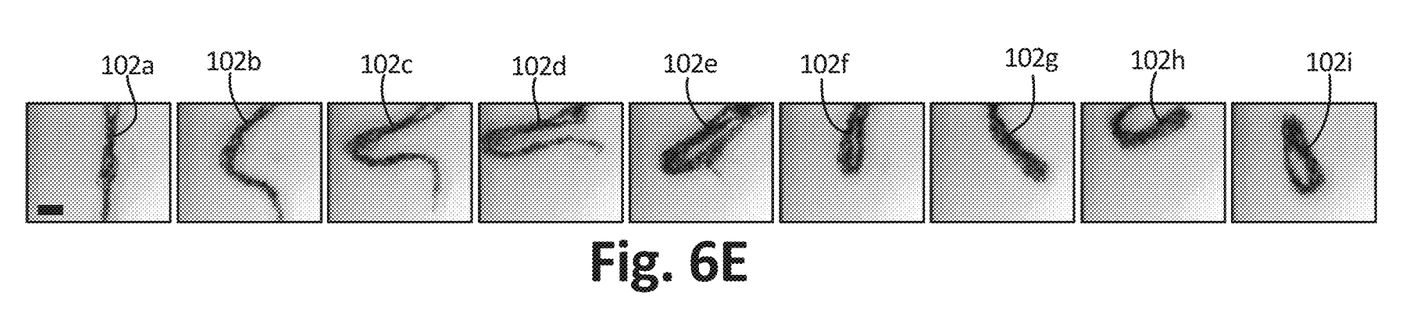

In the embodiment shown in FIG. 6e, a sequence of still shots is taken illustrating how by sweeping the frequency to set up acoustic standing waves alternating from the x direction to the z direction can be used to fold the ribbon-like structure (shown in frames 102a-102i) multiple times onto itself, resulting in an ordered three-dimensional array. The embodiment illustrated in FIG. 6e utilizes DNA dispersed within the solution to promote particle adhesion as described with respect to FIG. 6d.

In first frame 102a the ribbon-like array of stacked particles are aligned in a single direction (i.e., parallel to the z-axis). In frames 102b-102d, the direction of the acoustic wave generated by the piezoelectric device is modified such that particles—as they exist in the ribbon like structure—are driven to a position parallel with the x-axis as shown in frame 102d. In this way, the ribbon-like structure is folded over on itself. In frames 102e-102i the direction of the acoustic waves generated by the piezoelectric device is returned to the original orientation such that the ribbon-like structure is again folded onto itself and the particles are once again aligned parallel to the z-direction. As a result of multiple folding operations, the initially two-dimensional ribbon (such as that shown in FIG. 6a) is folded onto itself a number of times, thereby creating a three-dimensional shape.

Figure 7A:
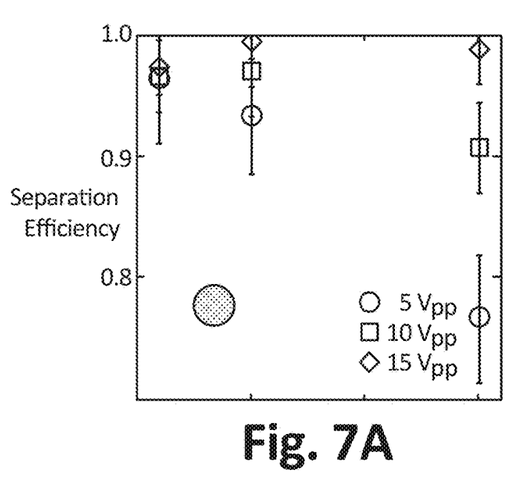
FIGS. 7a-7d illustrate the relationship between particle shape/size, flow rate, and separation efficiency according to embodiments of the present invention.
Figure 7B:
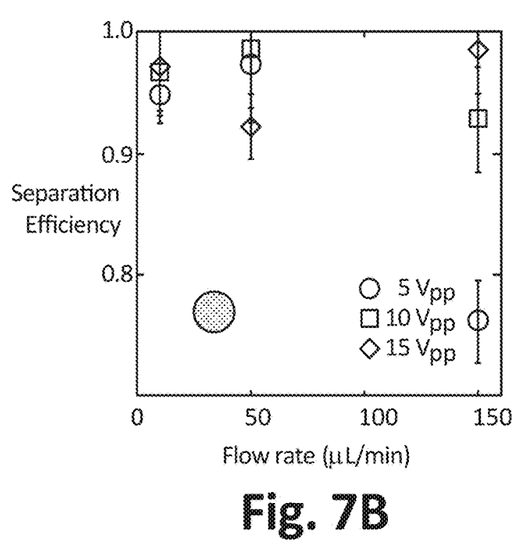
Figure 7C:
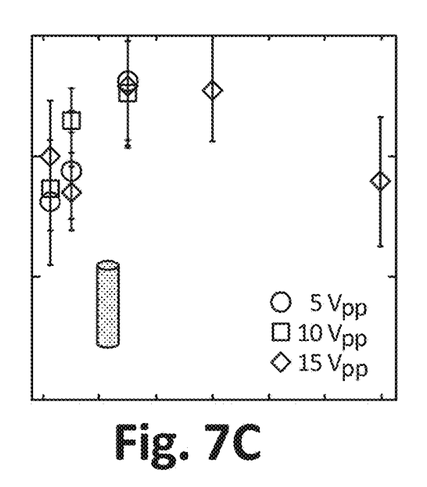
Figure 7D:
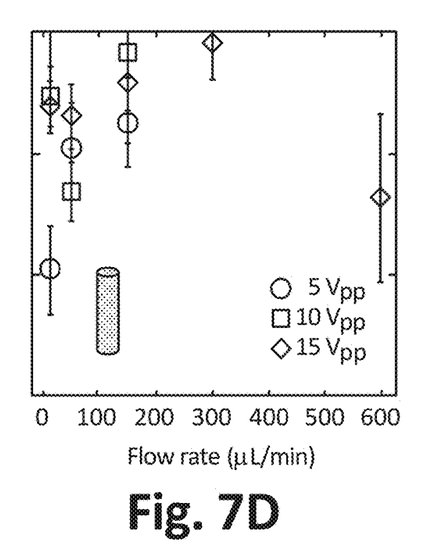

FIGS. 7a-7d illustrate separation/filtering results for anisotropic and non-anisotropic particles of various sizes by an acoustophoresis device according to embodiments of the present invention. FIGS. 7a and 7b illustrate separation efficiencies for sphere-shaped particles (i.e., non-anisotropic) of different concentrations in suspension—0.1 and 0.5 nominal wt %, respectively at excitation voltages of 5 $V_{pp}$, 10 $V_{pp}$, and 15 $V_{pp}$, and at flow rates of 10, 50, and 150 μL/min. Likewise, FIGS. 7c and 7d illustrate separation efficiencies for micro-rod shaped particles (i.e., anisotropic particles) of different sizes—0.1 and 0.5 nominal wt %, respectively—at excitation voltages of 5 $V_{pp}$, 10 $V_{pp}$, and 15 $V_{pp}$, and at flow rates of 10, 50, 150, 300 and 600 μL/min. In each figure, separation of the particles at an excitation voltage of 5 $V_{pp}$ is illustrated by a circle, 10 $V_{pp}$ is illustrated by a square, and 15 $V_{pp}$ is illustrated by a diamond. Flow rates are denoted along the x-axis, while separation efficiencies are denoted along the y-axis. Particle sizes were selected by volume to be approximately equal in order to ascertain the effect of particle shape on the separation efficiency achieved at each voltage.

FIGS. 7a and 7b illustrate separation efficiencies for micro-spheres. In particular, at low flow rates (i.e., 10 µL/min), the separation efficiency is approximately the same regardless of the excitation voltage applied. In general, as the flow rate increases the separation efficiency of the micro-spheres decreases. In addition, at higher flow rates the excitation voltage applied has a greater effect on the separation efficiency achieved.

FIGS. 7c and 7d illustrate separation efficiencies for micro-rods. In contrast with the microspheres, the micro-rods illustrate increased separation efficiency at increased flow rates (e.g., as the flow rate increases from 10 µL/min to 300 µL/min). Only at the very highest flow rates, when the flow rate approaches 600 µL/min does the separation efficiency of the micro-rods begin to decrease. This indicates that the anisotropic effect of the micro-rods improves separation efficiency in the presence of flow.

Figure 8A:
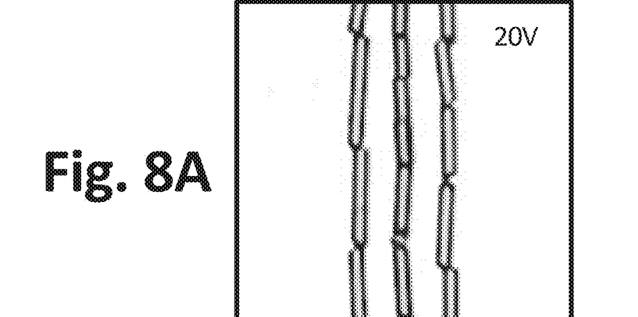
FIGS. 8a-8c illustrate the relationship between voltage applied to the piezoelectric device and formation of one or more columns according to an embodiment of the present invention.
Figure 8B:
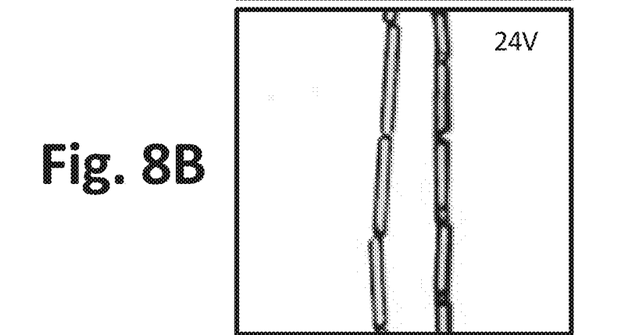
Figure 8C:
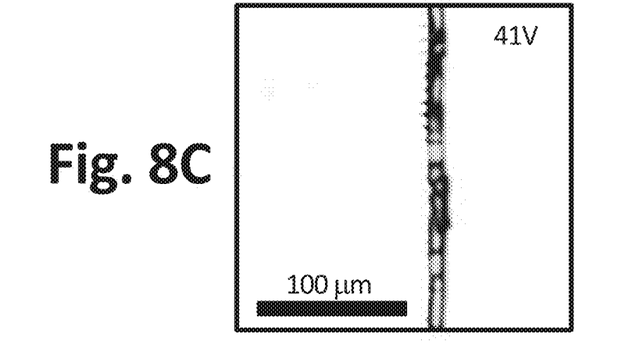

FIGS. 8a-8c illustrate the relationship between voltage applied to the piezoelectric device and formation of one or more columns according to an embodiment of the present invention. In FIG. 8a, an excitation voltage of 2.0 $V_{pp}$ is applied to piezoelectric device. The resulting balance of primary forces and secondary scattering forces result in the particles being organized into three parallel columns. That is, at this excitation, the scattering force between the various columns balances the primary force attempting to collapse the columns to the center (i.e., to the pressure node of the acoustic wave). In FIG. 8b, the excitation voltage is increased to 24 $V_{pp}$. The increase in excitation voltage results in an increase in the magnitude of the acoustic wave provided to the channel, and as a result an increase in the primary forces applied to the particles. In response, two of the columns are collapsed into a single column, resulting in a total of two columns. That is, at an excitation voltage of 24 $V_{pp}$, primary forces and secondary scattering forces are balanced with two columns. Similarly, when the excitation voltage is increased from 24 $V_{pp}$ to 41 $V_{pp}$, the primary force once again outweighs the secondary scattering forces and causes the two columns shown in FIG. 8b to collapse into a single column.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A three-dimensional (3D) printer, comprising:
    an acoustophoresis device having at least a first inlet, at least a first outlet, and a channel defined between the first inlet and the first outlet;
    a first piezoelectric device adhered to a surface of the acoustophoresis device to generate sound waves within at least a first portion of the channel; and
    a printhead connected to the first outlet of the acoustophoresis device, the printhead utilized to deposit a material onto a surface for 3D printing;
    wherein a solution comprising unordered anisotropic particles is delivered to the at least first inlet and wherein the anisotropic particles are organized into one or more columns and are oriented along a long axis of the anisotropic particles in a direction of flow of the solution by standing acoustic waves generated by the first piezoelectric device, wherein the at least one column of anisotropic particles is aligned with the first outlet, and wherein the first outlet is in fluid communication with the printhead to deliver one or more columns comprised of a plurality of ordered, anisotropic particles oriented along the long axis of the anisotropic particles to the printhead, wherein the printhead deposits the one or more columns comprised of a plurality of ordered, anisotropic particles oriented along the long axis of the anisotropic particles onto the surface.

2. The 3D printer of claim 1, wherein the acoustophoresis device further includes a waste outlet, wherein anisotropic particles organized into one or more columns within a center of the channel are provided to the first outlet and wherein excess solution is provided to the waste outlet.

3. The 3D printer of claim 1, wherein the acoustophoresis device includes a first stage and a second stage, wherein the first stage includes the at least first inlet and the first outlet, and wherein the second stage includes at least a second inlet and a second outlet, wherein the at least second inlet is in fluid communication with the first outlet of the first stage and wherein the second outlet is in fluid communication with the printhead.

4. The 3D printer of claim 3, further including a second piezoelectric device adhered a surface of the acoustophoresis device to generate sound waves within the second stage of the acoustophoresis device, wherein the first piezoelectric device generates sound waves within the first stage of the acoustophoresis device.

5. The 3D printer of claim 1, wherein the solution in which the anisotropic particles are suspended is an epoxy-type solution, and wherein the apparatus further includes a thermal curing element located upstream of the printhead, wherein the thermal curing element thermally cures the epoxy-type solution to preserve the organization of the anisotropic particles.

6. The 3D printer of claim 1, wherein the solution in which the anisotropic particles are suspended is a hydrogel solution, and wherein the 3D printer further includes a photo-curing window located upstream of the printhead, wherein the photo-curing window allows incident light to cure the hydrogel solution to preserve the organization of the anisotropic particles.

7. The 3D printer of claim 1, wherein the anisotropic particles have a length, a height, and a width, wherein the length of the anisotropic particles is greater than the height or width.

8. The 3D printer of claim 7, wherein oriented along the long axis of the anisotropic particles places the particles in an end-to-end configuration, wherein anisotropic particles are located adjacent to one another.

* * * * *